Aug. 13, 1957 C. I. WELCH 2,802,271
ANGLE ESTABLISHING AND DETERMINING DEVICE
Filed Dec. 23, 1954
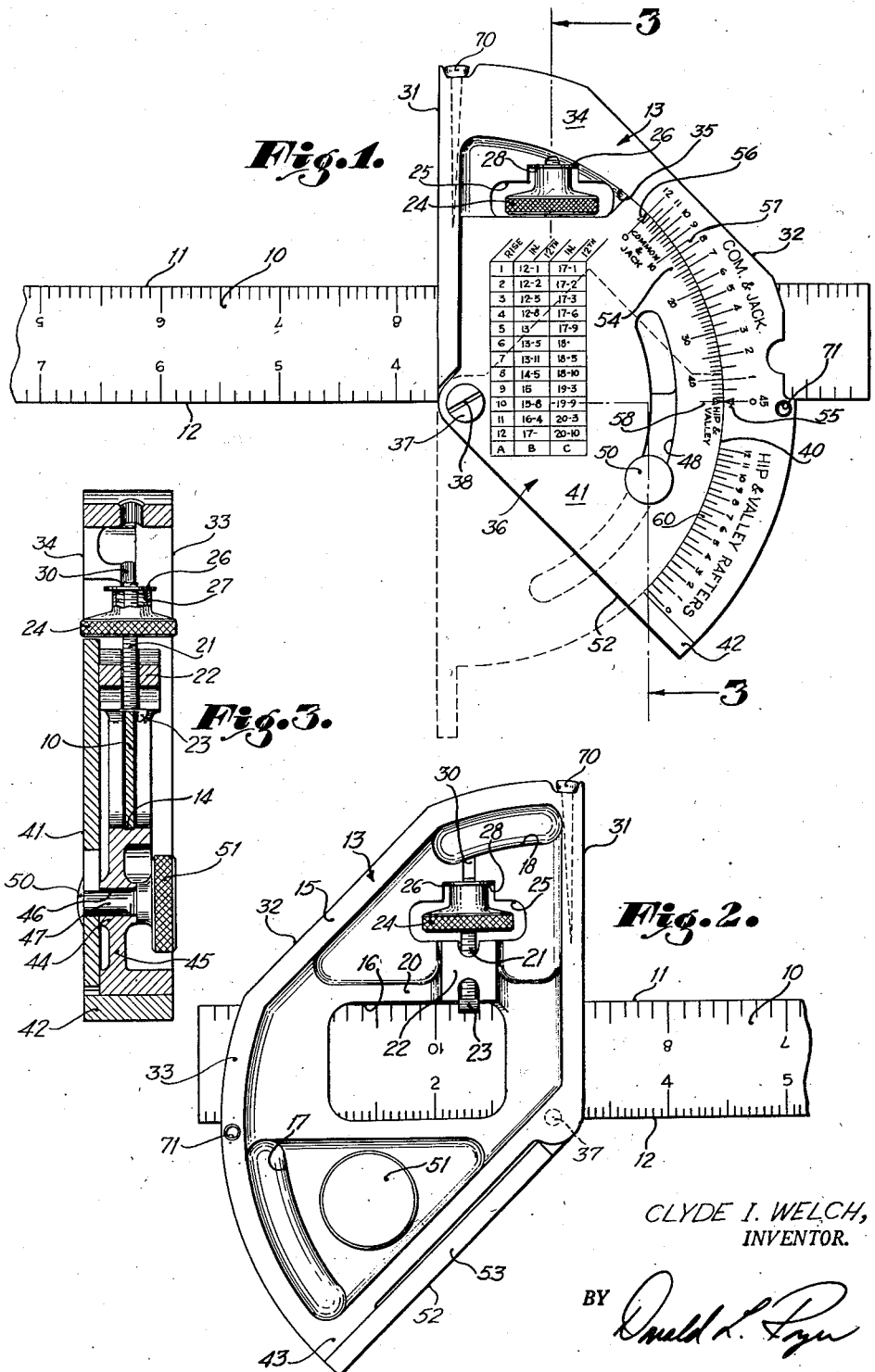
CLYDE I. WELCH,
INVENTOR.
BY
AGENT.

United States Patent Office 2,802,271
Patented Aug. 13, 1957

2,802,271

ANGLE ESTABLISHING AND DETERMINING DEVICE

Clyde I. Welch, Pasadena, Calif.

Application December 23, 1954, Serial No. 477,171

2 Claims. (Cl. 33—102)

The present invention relates generally to an angle establishing and determining device and relates more particularly to a tool for use by carpenters and the like when framing the roof structure of a building.

The present application is an improvement on the device shown in my Patent No. 2,173,348 issued September 19, 1939.

Heretofore, when framing a building roof structure or the like and both establishing and cutting common, jack, hip and valley rafters it has been necessary to utilize various difficult to handle measuring devices and to resort to considerable mathematical computation in order to arrive at a proper length for such rafters and to determine the proper angle at which such rafters must be cut in order properly to fit within the structure. With inexperienced personnel, it is not always possible to arrive at proper lengths and angles thereby undesirably wasting considerable amounts of building material, utilizing time that would otherwise be spent for more profitable work and creating a class of workmanship that is not the most desirable. Accordingly, it is necessary that both inexperienced and experienced workmen be provided with a facility whereby rafter lengths may be accurately determined as rapidly as possible and whereby the angular relationship may also be accurately and rapidly determined.

While the primary interest in the utilization and provision of a tool to accomplish the above results is the accurate and rapid determination of lengths and angles, such a tool must necessarily be rugged in construction, relatively simple in operation and above all, easy for the average workman to use without an excessive knowledge of mathematics, reference to complex charts or drafts or consultation with other workmen.

It is accordingly one important object of the present invention to provide an angle establishing and determining device in the form of a tool that is efficient in operation, light in weight, rugged in construction while still being easy and simple to use.

Another important object of the present invention is to provide an angle establishing and measuring device for use by workers in the building trades when framing a roof structure and which may be carried easily by the workmen and which is easily adjusted to various positions as determined by the requirements of a particular building structure.

A still further important object of the present invention is to provide an angle establishing and determining device that is constructed for operation in conjunction with a straight edge and wherein means are provided for locking the device at various positions along the straight edge and for establishing and locking the operating components of the device at various angular relationships relative to edges of the straight edge.

Other and further important objects of the present invention will become apparent from the disclosures in the following detailed specification, appended claims and accompanying drawing, wherein:

Fig. 1 is a side elevational view of the angle establishing and determining device of the present invention;

Fig. 2 is a rear elevation view of the device; and

Fig. 3 is a transverse sectional view through the device as taken substantially as indicated by line 3—3, Fig. 1.

With reference to the drawing, the device of the present invention comprises an elongated blade 10 that is provided with parallel edges 11 and 12. As shown in Figs. 1 and 2, the blade 10 may be graduated on one side in both eighths and twelfths and on the other side in eighths and sixteenths in order that various measurements may be made within various tolerances without resorting to other measuring arrangements and devices. The use of twelfths is quite common in the building trades and is considerably more convenient to utilize than other odd divisions of an inch.

A body member indicated generally at 13 is provided with a rectangular slot 14 in which the blade 10 is slidably disposed. Thus, the body 13 is free to move along the blade 10 with the slot 14 closely encompassing the sides and edges 11 and 12 of the blade in order to provide rigidity between the body 13 and the blade. It is to be noted that the body member 13 extends laterally on each side of the blade approximately an equal distance and extends beyond the edges 11 and 12.

The body member 13 has a peripheral flange portion 15 extending about the periphery thereof which serves to add rigidity to the body member and is further provided with a plurality of cut out portions as at 16, 17, and 18 in order to add lightness to the structure of the body. A longitudinal web 20 extends between the forward and rearward face of the body portion there being a screw 21 disposed through the enlarged portion 22 on the web. The lower end of the screw 21 is adapted to carry a fitting 23 that is generally L-shaped with one portion thereof being adapted for engagement with the edge 11 of the blade 10. A finger engaging nut 24 is disposed about the threads on the screw 21 and in an opening 25 formed through the body 13. The upper end of the screw 24 is adapted to engage a washer 26 that is spring loaded away from the nut 24 by means of a compression spring 27 with the washer 26 engaging the upper portion of a recess 28 in the body 13 adjacent the opening 25. The upper end of the screw 21 is adapted for free travel within a cut out portion 30 in a portion of the body 13. Thus, by rotating the nut 24 to the right as viewed in Figs. 1 and 2, the nut will engage the washer 26 and in turn the base of the cut out portion 28 to force the screw 21 downwardly and the fitting 23 into engagement with the edge 11 of the blade 10. This arrangement thus locates the blade 10 and forces the edge 12 thereof into contact with the lower side of the slot 14 thereby to lock the body member 13 at any desired position along the blade 10.

As shown primarily in Figs. 1 and 2, the body member 13 is provided with a first planar surface 31 on the outer portion of the peripheral flange 15 with this surface being disposed at right angles to the edges 11 and 12 of the blade 10.

The body 13 is further provided with a second planar surface 32 on the side of the body remote from the planar surface 31 with the surface 32 being disposed at an angle of 45° to the edges 11 and 12 of the blade 10. The surfaces 31 and 32 serve as a means for establishing either a square condition or a condition at 45° from a square as may be desired for various angle and normal cut establishments along sections of lumber. Thus, either a normal or a 45° cut may be made without further adjustment of the present device.

As shown primarily in Fig. 3, the body member 13 has parallel sides 33 and 34 with the side 33 being established by means of the peripheral flange 15 and the side 34 being established by means of the other side of the peripheral flange 15 together with other portions of the body member. As shown primarily in Fig. 1, the body member 13 has an arcuate cut out 35 that is recessed below the surface 34 of the body member. An arcuate quadrant 36 is disposed in the arcuate cut out 35 and pivoted to the body member 13 by means of a screw 37 which has an axis 38 lying along the line of the edge 12 of the blade 10. The quadrant 36 has an arcuate edge 40 that is adapted to engage the inner edge of the arcuate cut out 35. Additionally, the outer surface 41 of the quadrant 36 is in coplanar relationship to the surface 34 of the body 13 whereby the arcuate edge 40 and the arcuate edge 35 will lie adjacent each other in all positions of movement of the quadrant 36. The quadrant 36 has a radially extending tab 42 disposed therefrom and adapted for engagement with a radially outer portion 43 of the peripheral flange 15 of the body 30. The tab 42 serves to limit movement of the quadrant 36 about the pivot 37 thereof.

As shown primarily in Fig. 3, the body 13 is provided with a boss 44 which extends laterally on each side of a web portion 45 thereof. The boss 44 is provided with a bore 46 in which a screw 47 is disposed. The screw 47 also extends through an arcuate slot 48 in the quadrant 36 with a head portion of the screw indicated at 50 being adapted for engagement with the outer surface 41 of the quadrant 36. A thumb engaging nut member 51 is adapted for disposition about the threaded end of the screw 47 and, when tightened, will retain the quadrant 36 at any desired position relative to the body 13.

Thus, it is to be noted that the quadrant 36 is provided with a third planar surface 52 which is defined by a flange 53 extending at right angles to the surface 41 of the quadrant with this third planar surface 52 being movable as indicated by the dotted lines in Fig. 1 from a position at 45° to the edge 12 of the blade 10 to a position normal to the edge 12. As described hereinbefore, the quadrant may be locked at any desired position between this 45° and 90° relationship with the edge 12 of the blade 10.

The corresponding edges of the quadrant 36 and the body 13, along the arcuate joint therebetween, provide it with certain indications as to the angular relationship and the various types of dispositions for the quadrant 36 depending upon the type of rafter to be cut. The angular relationship of the surface 52 relative to the edge 12 may be determined by means of the scale 54 along the edge of the quadrant 36 in the setting thereof relative to an index 55 on the body 13. By utilizing an index 56 on the quadrant 36, and setting this index adjacent one or the other of the numbers in a scale 57 along the arcuate edge of the cut out 35, the surface 52 may be established at any desired angle depending upon the type of common or jack rafters to be cut. Likewise, by using the index 58 on the quadrant 36 and the scale 60 on the edge of the cut out 35, the surface 52 may be set at any desired angle relative to the type of hip or valley rafters to be cut.

The surface 41 of the quadrant 36 is provided with a suitable chart which has three columns set forth as columns A, B, and C. Column A indicates the type of proportionate rise in rafters and is set out in inches in accordance with the amount of rise per one foot of horizontal travel. Column B sets forth the length of common and jack rafters in accordance with the proper rise and column C sets forth the length of hip and valley rafters in accordance with the proper rise. In other words, there would be assumed that the particular building has a rise of 5" in 1'. Therefore, the common and jack rafters will have a length of 13" for each cut out horizontal travel and the hip and valley rafters will have a length of 17 9/12" for each foot of horizontal travel. As far as the angle is concerned for the cut on the end of the rafter, it is then only necessary to set the index 56 opposite the 5 on the scale 57 for the common and jack rafters or to set the index 58 opposite the 5 in the scale 60 for the hip and valley rafters to determine the angle of cut.

In order that the tool of the present invention may be more versatile, a pin 70 is carried by an opening in the body 13 with this pin being available to be removed and inserted in a bore 71 through the body adjacent the edge 12 of the blade 10. Thus, the device of the present invention may be utilized as a compass with a pencil being placed at the end of the blade remote from the hole or opening 71.

Having thus described the invention and the present embodiment thereof it is desired to emphasize the fact that many modifications may be resorted to in a manner limited only by a just interpretation of the following claims.

I claim:

1. An angle establishing and measuring device comprising, in combination: a blade having elongated parallel edges; a body member; a slot in said body member for slidably receiving said blade, said body member extending laterally on each side of said blade; a screw means carried by said body and engaging one edge of said blade for locking said body to said blade at any desired position; a first planar surface on said body disposed at a fixed right angle to said blade edges; a second planar surface on said body disposed at a fixed 45° to said blade edges; parallel side surfaces on said body; an arcuate cutout in one of said side surfaces; an arcuate quadrant disposed in said cutout, the outer surface of said quadrant being coplanar with said one of said side surfaces; means for pivotally mounting said quadrant in said cutout; means for limiting pivotal movement of said quadrant; an adjustable third planar surface, on said quadrant and disposed, at one limit of said pivotal movement, at 45° to said blade edges and parallel to said second planar surface and at another limit at right angles in said blade edges and coextensive with said first planar surface; means carried by said body and engageable with said outer surface of said quadrant for locking said quadrant at any desired position between said limits; a data table on said quadrant; mating arcuate edges between said body member and said quadrant; and angle indications along said edges, said indications being related to said data table.

2. An angle establishing and measuring device according to claim 1 wherein said means for limiting movement of said quadrant comprises, at one limit of pivotal movement, a peripherally disposed radially extending tab on said quadrant and adapted for engagement with a portion of said body adjacent one end of said arcuate edge thereon.

References Cited in the file of this patent

UNITED STATES PATENTS

| Re. 9,419 | Starrett | Oct. 19, 1880 |
|---|---|---|
| 672,382 | Lucy | Apr. 16, 1901 |
| 1,035,237 | Ritschard | Aug. 13, 1912 |
| 1,080,222 | Kowalsky | Dec. 2, 1913 |
| 1,532,353 | Waldron | Apr. 7, 1925 |
| 1,974,930 | Powe | Sept. 25, 1934 |
| 2,173,348 | Welch | Sept. 19, 1939 |
| 2,556,781 | Smithson | June 12, 1951 |
| 2,570,356 | Luis | Oct. 9, 1951 |
| 2,677,184 | Lindenbein | May 4, 1954 |